United States Patent [19]

Nogami et al.

[11] Patent Number: 5,040,569

[45] Date of Patent: Aug. 20, 1991

[54] DIRECT-OPERATED SERVO VALVE, FLUID PRESSURE SERVO MECHANISM AND CONTROL METHOD FOR THE DIRECT-OPERATED SERVO VALVE

[75] Inventors: Tadahiko Nogami, Mito; Ichiro Nakamura, Katsuta; Ichiro Maeno, Hitachi, all of Japan

[73] Assignee: Hitachi, Ltd., Tokyo, Japan

[21] Appl. No.: 479,519

[22] Filed: Feb. 13, 1990

[30] Foreign Application Priority Data

Mar. 13, 1989 [JP] Japan .................................. 1-057751

[51] Int. Cl.[5] .............................................. F16K 31/04

[52] U.S. Cl. .......................... 137/625.65; 137/625.21; 251/129.04; 251/129.13

[58] Field of Search ...................... 137/625.21, 625.22, 137/625.23, 625.24, 334, 625.65; 251/129.04, 129.11, 129.13

[56] References Cited

U.S. PATENT DOCUMENTS 4,735,233 4/1988 Nogami ...................... 137/625.21 X
4,845,416 7/1989 Scholl ........................ 251/129.11 X
4,858,650 8/1989 Devaud ...................... 251/129.04 X

FOREIGN PATENT DOCUMENTS 63-53972 4/1988 Japan .

*Primary Examiner*—Alan Cohan
*Attorney, Agent, or Firm*—Antonelli, Terry, Stout & Kraus

[57] ABSTRACT

A direct-operated servo valve which exhibits stable damping characteristics. The servo valve is characterized in that a viscous fluid is charged in the gap between a stator and a movable element. The velocity of a valve member is detected and a feed back the velocity signal is obtained by this detection so as to enable a damping of the motion of the valve member.

7 Claims, 19 Drawing Sheets

$$W_1(S) = \frac{Q(S)}{e_i(S)} = \frac{G_A K_f K_Q}{LmS^3 + (Rm + LC_1)S^2 + (Lk + RC_1 + K_f^2)S + Rk + G_A G_x K_f}$$

$W_1$ ---- TRANSFER FUNCTION OF PROCESS BETWEEN INPUT SIGNAL ei AND OUTPUT FLOW RATE Q WHEN DAMPING EFFECT DERIVED FROM VISCOUS RESISTANCE OF VISCOUS FLUID ONLY IS CONSIDERED $C_1$ ---- VISCOUS DAMPING COEFFICIENT BASED ON VISCOUS RESISTANCE OF VISCOUS FLUID

FIG. 2

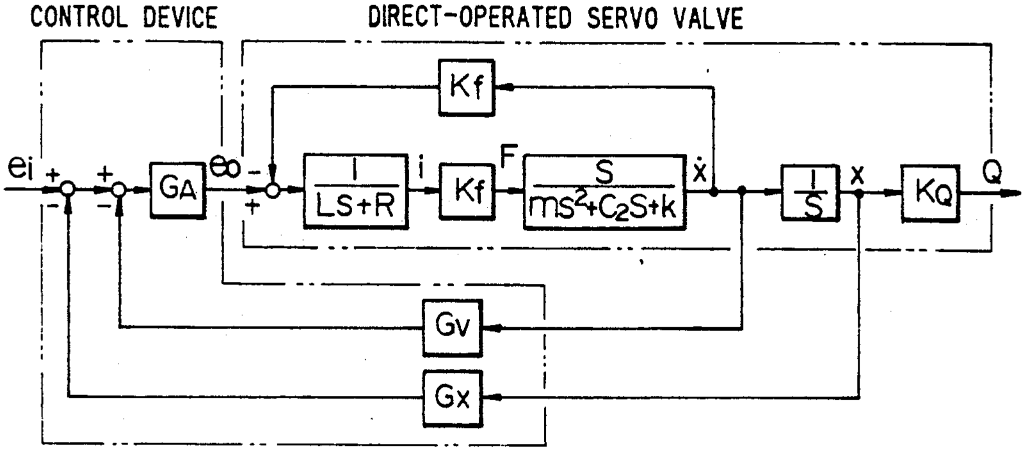

$$W_2(S)=\frac{Q(S)}{e_i(S)}=\frac{G_A K_f K_Q}{LmS^3+(Rm+LC_2)S^2+\{Lk+RC_2+(K_f+G_A G_V)K_f\}S+Rk+G_A G_x K_f}$$

$W_2$ ---- TRANSFER FUNCTION OF PROCESS BETWEEN INPUT SIGNAL ei AND OUTPUT FLOW RATE Q WHEN BOTH DAMPING EFFECT DERIVED FROM VISCOUS RESISTANCE OF VISCOUS FLUID AND DAMPING EFFECT BASED ON VELOCITY FEEDBACK ARE CONSIDERED $C_2$ ---- VISCOUS DAMPING COEFFICIENT BASED ON VISCOUS RESISTANCE OF VISCOUS FLUID $G_V$ ---- VELOCITY FEEDBACK GAIN

DRIVING FORCE $F = m\ddot{x} + c\dot{x} + kx$

VALVE DISPLACEMENT $x = a \sin wt$

VISCOUS DAMPING COEFFICIENT BASED ON VISCOUS RESISTANCE OF VISCOUS FLUID $C =$ { $C_1$ ---- WHEN DAMPING IS CONSIDERED IN TERMS OF VISCOUS RESISTANCE OF VISCOUS FLUID ALONE $C_2$ ---- WHEN DAMPING IS CONSIDERED IN TERMS OF VISCOUS RESISTANCE OF VISCOUS FLUID AND VELOCITY FEEDBACK }

$(C_1 > C_2)$

DIRECT-OPERATED SERVO VALVE, FLUID PRESSURE SERVO MECHANISM AND CONTROL METHOD FOR THE DIRECT-OPERATED SERVO VALVE

BACKGROUND OF THE INVENTION

1. FIELD OF THE INVENTION

The present invention relates generally to direct-operated servo valves and, more particularly, to the arrangement of a direct-operated servo valve which is not susceptible to a disturbance such as vibration or impact, which consistently exhibits stable damping characteristics, and which can operate with reduced driving energy.

2. DESCRIPTION OF THE RELATED ART

As disclosed in, for example, Japanese Utility Model Unexamined Publication No. 63-53972, a conventional direct-operated servo valve of this kind adopts a method of damping the motion of a movable part by utilizing the viscous resistance of a viscous fluid charged in the gap between a stator and a movable element.

The method of effect damping by utilizing the viscous resistance of the viscous fluid charged in the gap between the stator and the movable element has been employed as a typical damping method for a direct-operated servo valve since this method is simple and convenient and further realizes the vibration-preventing effect of protecting the movable element from disturbances such as vibration and impact. In other words, since the viscous resistance of the viscous fluid exhibits a damping effect in various directions including the direction of normal motion thereof, if such a viscous fluid is charged in a space surrounding the movable element which has the weakest mechanical strength in the movable part, it is possible to protect the movable element from damage derived from disturbances.

The above method, however, has a number of problems. For example, since the damping force derived from the viscous resistance of the fluid acts directly on the movable element, the damping force acts as a force resisting the driving force generated by the movable element, thereby reducing the driving force correspondingly and increasing the loss of driving energy. In general, this resisting force is proportional to the velocity of the movable element and the viscosity of the fluid, whereas the above method requires a fluid having a relatively large viscosity. As a result, particularly in an arrangement which requires a rapid response, the loss of the driving force excessively increases and the above problem becomes serious. In other words, there are a number of problems such as an increase in the size of a driving means, an increase in driving current, an increase in the amount of heat generated, an increase in the size of a control device, and difficulty in realizing a rapid response.

Also, if the viscosity of the fluid varies with a change in temperature, the damping characteristics also vary, resulting in the characteristics of the control system varying.

Furthermore, since it is necessary to use a fluid having a relatively large viscosity which is difficult to circulate, the heat generated by the driving means tends to be confined in the interior and the temperature easily rises. This leads to the problem that variation in the above characteristics easily occurs.

SUMMARY OF THE INVENTION

It is an object of the present invention to provide a direct-operated servo valve which is not susceptible to a disturbance such as vibration or impact and yet which consistently exhibits stable damping characteristics and a method of controlling the same.

It is another object of the present invention to provide a fluid pressure servo mechanism for a direct-operated servo valve which is capable of realizing stable damping characteristics with reduced driving energy.

To achieve the above objects, in accordance with one aspect of the present invention, there is provided a direct-operated servo valve which comprises a casing structure, a valve member movably disposed in the casing structure, a stator secured to the casing structure, a movable element integrally connected to the valve member and arranged to be drivable by a drive command, and, a viscous fluid charged between the stator and the movable element, the aforesaid drive command being a command obtained by detecting the velocity of the valve member and feeding back the detected velocity so as to damp the motion of the valve member.

In accordance with another aspect of the present invention, there is provided a method of controlling a direct-operated servo valve which includes a casing structure, a valve member movably disposed in the casing structure, a stator secured to the casing structure, a movable element integrally connected to the valve member, and a viscous fluid charged between the stator and the movable element. The method comprises the steps of detecting the velocity of the valve member, feeding back the velocity signal obtained by the detecting step so as to damp the motion of the valve member, thereby providing a drive command to be supplied to the movable element, and driving the movable element in accordance with the drive command.

In accordance with another aspect of the present invention, there is provided a fluid pressure servo mechanism which comprises a casing structure, a valve member movably disposed in the casing structure, a drive section including a stator secured to the casing structure and a movable element integrally connected to the valve member, a control section for giving a drive command to the movable element, and a viscous fluid charged between the stator and the movable element, the drive command being a command obtained by detecting the velocity of the valve member and feeding back the detected velocity so as to damp the motion of the valve member.

In accordance with the present invention, the damping method utilizing the viscous resistance of a fluid is to directly act a damping force on a movable part, whereas the damping method based on velocity feedback utilizes the step of purely changing the characteristics of a control system. Accordingly, the feature of the present invention is based on the property that no damping force serving as resistance directly acts on the movable part and the property that the viscous resistance of the fluid exhibits a damping effect in various directions including the direction of normal motion thereof.

In the present invention, the damping effect derived from the viscous resistance of the fluid is used in combination with the damping effect based on the velocity feedback. The damping effect derived from the viscous resistance of the fluid is primarily used for providing the vibration-preventing effect of protecting the movable element from disturbances such as vibration and impact, while the motion of the movable part in a normal direction is damped by primarily utilizing the damping effect based on the velocity feedback. With this arrangement, since the viscosity of the viscous fluid charged in the gap between the stator and the movable element may be small, resistance which directly acts on the movable part is reduced and the loss of driving force due to damping can be made small. Accordingly, no excessively large driving energy is required.

The above and other objects, features and aspects of the present invention will become apparent from the following description of embodiments taken in connection with the accompanying drawings.

BRIEF DESCRIPTION OF THE DRAWINGS

FIG. 2 is a block diagram showing the process of effecting damping by utilizing a damping effect based on the velocity feedback of a servo valve movable part in addition to that derived from the viscous resistance of a fluid and illustrates a sequence of steps starting with the inputting of a signal and ending with the outputting of a flow rate;

DETAILED DESCRIPTION OF THE PREFERRED EMBODIMENTS

Initially, the principle of the present invention is explained with reference to FIGS. 1 through 3.

Figure 1:
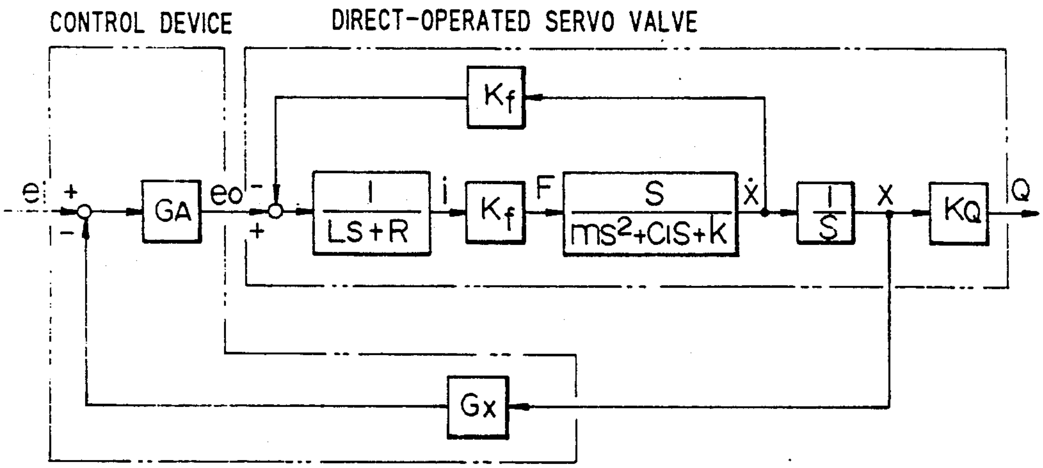
FIG. 1 is a block diagram showing the process of effecting damping by utilizing only the viscous resistance of a fluid and illustrates a sequence of steps starting with the inputting of a signal and ending with the outputting of a flow rate.

If only the viscous resistance of a viscous fluid is considered, a block diagram of a process starting with the inputting of a signal ei and ending with the outputting of a flow rate Q is as shown in FIG. 1. If the velocity feedback of a servo-valve movable part is considered in addition to such viscous resistance, the block diagram is as shown in FIG. 2.

If the terms of damping in the relationships shown in FIGS. 1 and 2 are compared, it can be seen that, in the case shown in FIG. 2, since the effect of the velocity feedback, i.e., velocity feedback gain $G_v$, is added, a viscous damping coefficient $C_2$ determined by the viscous resistance of the viscous fluid can be made smaller than a viscous damping coefficient $C_1$ obtained by using only the damping effect resulting from the viscosity of the viscous fluid. In other words, a viscous fluid of reduced viscosity may be charged in the gap between the stator and the movable element. Accordingly, resistance $C_x$ which directly acts on the movable part becomes small in proportion to the viscosity of the viscous fluid and the velocity of the movable part, and it is possible to effectively utilize a driving force F.

Figure 3:
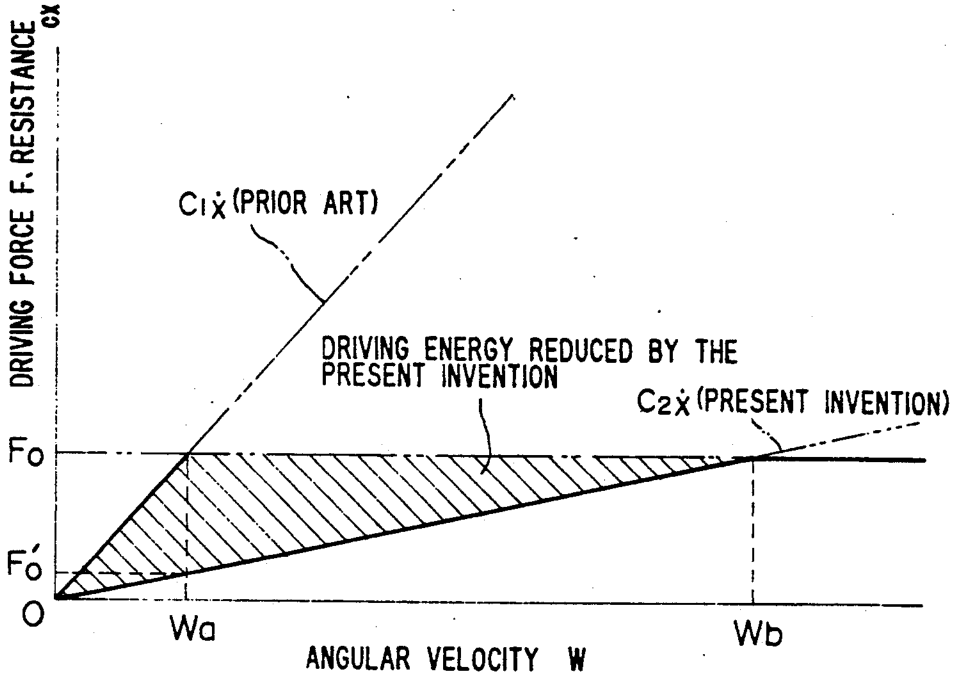
FIG. 3 is a view showing the relationship between the loss of driving force and the viscosity of a viscous fluid charged in the gap between a stator and a movable element.

Therefore, the relationship shown in FIG. 3 is established between an angular velocity $\omega$ with which the movable part is displaced with $x = a \cdot \sin \omega t$ and the resistance cx resulting from the viscous resistance of the fluid. For instance, the driving force required to drive the movable part up to an angular velocity $\omega a$ is reduced from $F_0$ to $F_0'$. Alternatively, the maximum angular velocity to which the movable part can be driven with the driving force $F_0$ increases from $\omega a$ to $\omega b$. More specifically, the required driving energy can be reduced by an amount represented by a shaded area in FIG. 3.

In addition, in the present invention, damping during a normal motion is obtained by utilizing primarily the damping effect based on the velocity feedback, and the viscosity of the viscous fluid and the velocity feedback gain are selected so that an amount $K_f G_A \cdot G_v$ dependent on the velocity feedback gain is greater than an amount $R_{c2}$ dependent on the viscous resistance of the fluid. Accordingly, it is possible to enjoy the effect of reducing the required driving energy to a further extent.

Embodiments of the present invention are described in detail below with reference to the accompanying drawings in which like numerals indicate like parts throughout the several views.

One embodiment of the present invention is explained with reference to FIGS. 4 through 10. The embodiment shown throughout these figures serves to illustrate an exemplary arrangement in which a position servo system is constructed using a direct-operated rotary servo valve.

To begin with, the structure and operation of a servo valve body will be explained.

A valve member 1 and a spacer 4 which is formed to be thicker than the valve member 1 by a predetermined difference are sandwiched between casings 2 and 3, and the valve member 1 is rotatably disposed therebetween. A disc-shaped movable element 6 is integrally coupled to a shaft 5 which extends from one end face of the valve member 1 through the casing 3.

The valve member 1 is provided with a cylindrical opening 7 and a through-opening 8. The casing 2 is provided with a sleeve 9 and channels 11 and 12, while the casing 3 is provided with a sleeve 10 and channels 13 and 14. Each of the sleeves 9 and 10 is formed coaxially to the cylindrical opening 7 and has an outer diameter substantially equal to the inner diameter of the cylindrical opening 7, and the channels 11, 12 and 13, 14 are separated from each other by the sleeves 9 and 10, respectively. The channels 11 and 13 are formed to communicate with each other by means of the through-opening 8. In the casing 2, a control port 15 is connected to the inner bore of the sleeve 9, a supply port 16 to the channel 11, and a discharge port 17 to the channel 12.

Figure 6:
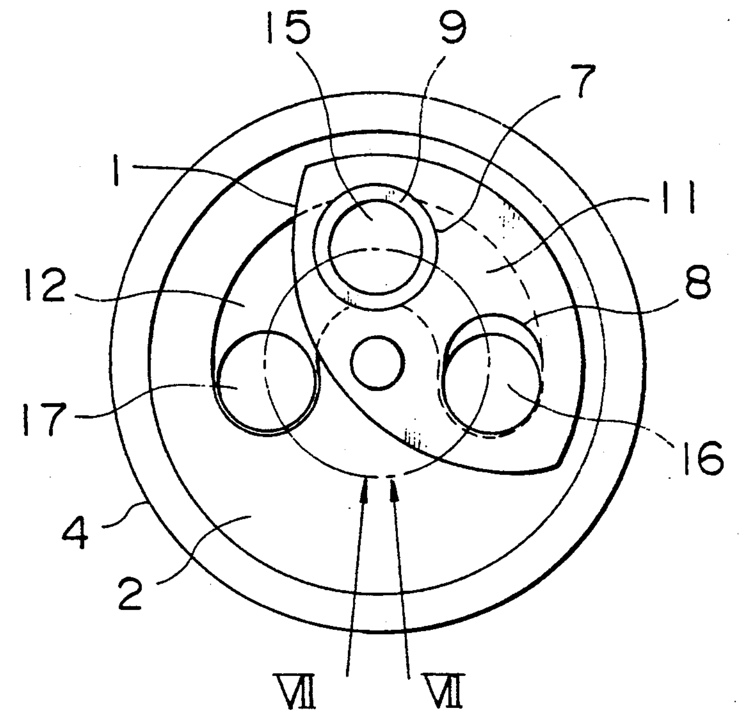
FIG. 6 is a view taken along line VI—VI of FIG. 4, and shows the valve when in its neutral state.
Figure 7:
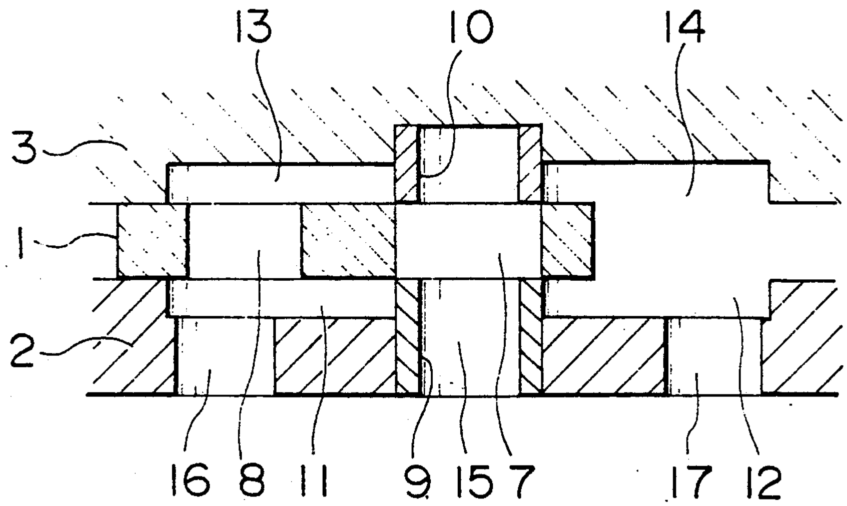
FIG. 7 is a sectional view developed along line VII—VII of FIG. 6.
Figure 8:
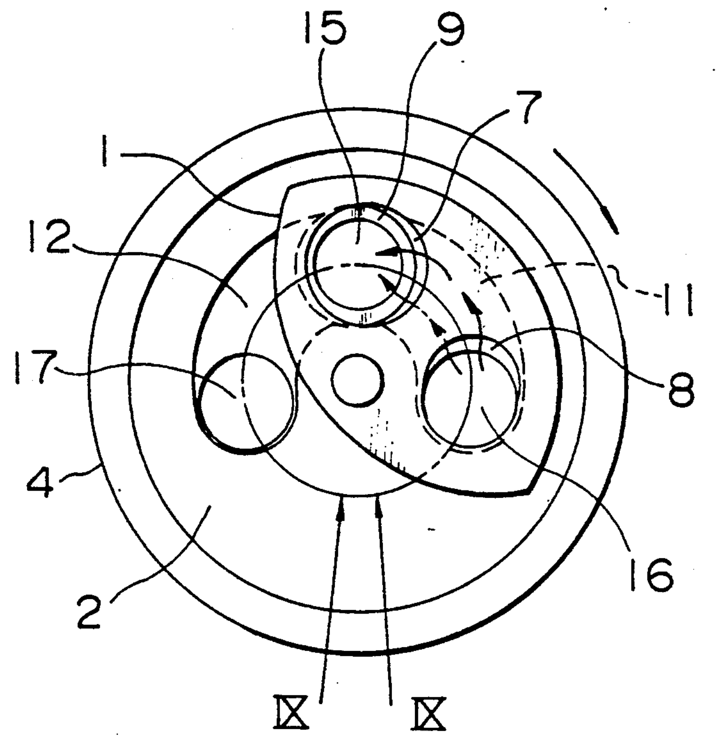
FIG. 8 is a view taken along line VI-VI of FIG. 4, and shows the valve when in its open state.
Figure 9:
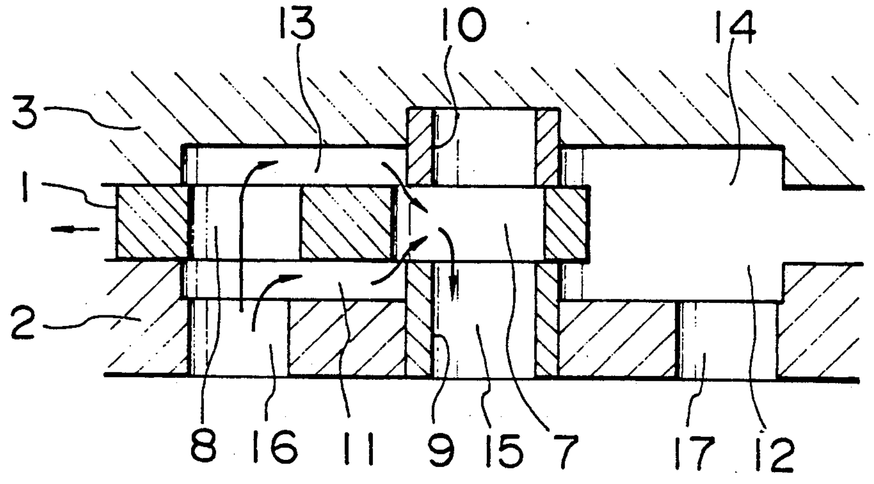
FIG. 9 is a sectional view developed along line IX—IX of FIG. 8.

In this arrangement, as shown in FIGS. 6 and 7, if the inner periphery of the cylindrical opening 7 is coincident with the outer periphery of each of the sleeves 9 and 10, the control port 15 is isolated from both the supply port 16 and the discharge port 17 in a neutral state wherein the fluid flow is halted. However, as shown in FIGS. 8 and 9, if the valve member 1 is displaced in the direction of the clockwise arrow of FIG. 8, a control orifice is opened, which is surrounded by the inner periphery of the cylindrical opening 7, the outer peripheries of the respective sleeves 9 and 10 and the inner and outer peripheries of the channels 11 and 13. Thus, the fluid flows from the supply port 16 into the control port 15. If the valve member 1 is displaced in the direction opposite to the clockwise arrow, the fluid flows from the control port 15 into the discharge port 17. In other words, this arrangement constitutes a three way valve which can continuously switch the fluid flow in the forward and reverse directions.

Figure 10:
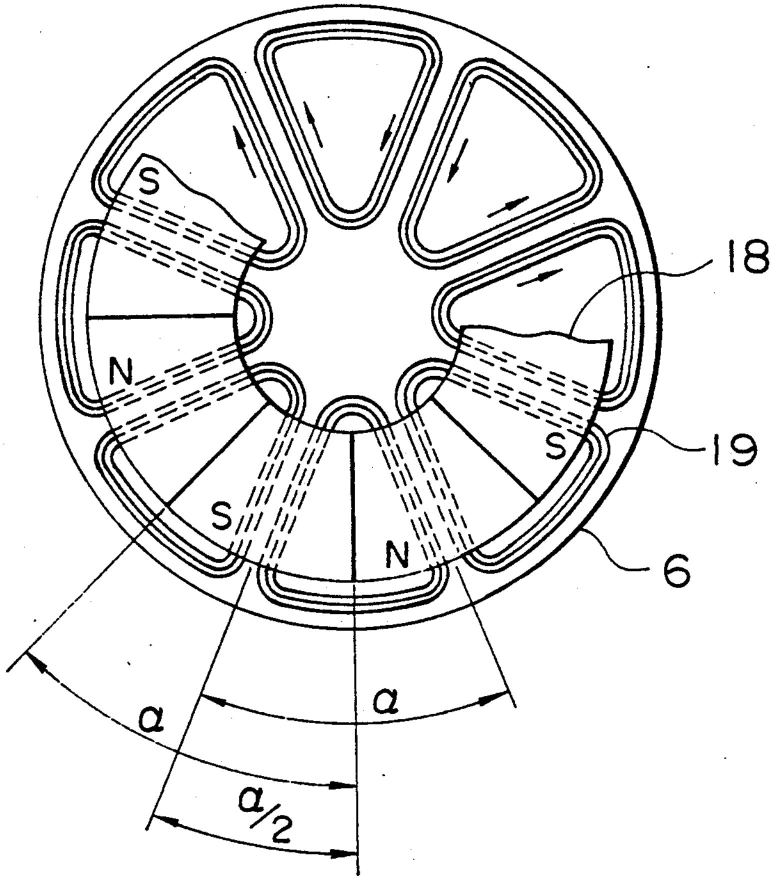
FIG. 10 is a diagrammatic plan view showing the construction of a driving means for the direct-operated rotary servo valve shown in FIG. 4.

The movable element 6 is rotatably interposed in a predetermined gap between the magnet 18 and the casing 3, which serves as a yoke. As shown in FIG. 10, the movable element 6 is provided with a plurality of coils 19 which are arranged so that the winding direction alternates around the circumference at intervals of angle $\alpha$. In like manner, the magnet 18 is also polarized so that the polarity of each pole alternates around the circumference at intervals of angle $\alpha$. The valve member 1 and the movable element 6 are coupled so that the boundaries between the coils 19 of alternate poles and the boundaries between the adjacent poles of the magnet 18 are offset from each other by the angle $\alpha/2$. Accordingly, the electromagnetic forces generated at the respective poles when electrical currents are supplied to all the coils 19, act to generate a moment in the same direction, thereby rotating the valve member 1.

Further, an angular displacement sensor 20 and an angular velocity sensor 21 are disposed at the side of the magnet 18 which is opposite to the movable element 6. A detecting shaft which extends from the sensors 20 and 21 is coupled to the valve member 1 and the movable element 6.

To execute position control of a desired object 22, a signal 24 output from a displacement sensor 23 provided on the desired object 22 is fed back as a feedback signal to a control device 25. The control device 25 compares the output signal 24 with a desired value 26, and drives the servo valve on the basis of the obtained deviation to control motion of an actuator. In addition, in the direct-operated servo valve of the above embodiment, a signal 27 output from the angular displacement sensor 20 is also fed back to the control device 25 to provide position control over the valve member 1, whereby an output flow rate accurately proportional to an input signal can be obtained. The casing 3 is provided with a shaft seal 29 to isolate the valve side from the drive side, and a viscous fluid 30 is charged in the gap between the movable element 6 and the magnet 18 and the gap between the movable element 6 and a stator, i.e., the casing 3. In addition, an angular velocity signal 28 output from the angular velocity sensor 21 is also fed back to the control device 25 to constitute a closed loop for velocity feedback.

However, when the movable element 6 is in motion, damping is also provided by the viscous resistance of the fluid. For this reason, in the above embodiment, the damping effect derived from the viscous resistance of the fluid is primarily used for protecting the movable element 6 from disturbances such as vibration and impact. During normal motion, damping is obtained primarily utilizing a damping effect based on velocity feedback. More specifically, with respect to the direction of normal motion, the viscosity of the viscous fluid and the gain of the velocity feedback are set so that the damping effect based on the velocity feedback is greater than the damping effect derived from the viscous resistance of the fluid.

Accordingly, in the above embodiment, since the viscosity of the viscous fluid 30 can be reduced by an amount corresponding to the damping effect based on the velocity feedback, resistance which directly acts on the movable element 6 during rotation of the movable element 6 and the valve member 1 is reduced in proportion to the angular velocities thereof and the viscosity of the viscous fluid 30, whereby the loss of driving force can be made small. Accordingly, since no excessively large driving energy is required, driving means of small size may be utilized and no excessively large driving current is needed, and good response characteristics can still be achieved. Moreover, the amount of heat generated by the driving means is reduced and the control device may be small size.

Also, since the viscous resistance of the fluid has the damping effect of protecting the movable element from disturbances such as vibration and impact, it is not necessary to reinforce the movable element to assure a satisfactory vibration-preventing effect. Accordingly, since a movable element with a reduced-weight structure may be utilized and the inertial load of the movable element can be decreased, the required driving energy can be reduced to a further extent.

Furthermore, since damping characteristics can be electrically set, they can be easily adjusted to characteristics best suited for various service conditions. Even if the viscosity of a fluid varies with a temperature, the damping characteristics do not substantially vary, whereby consistently stable characteristics can be obtained.

Figure 11:
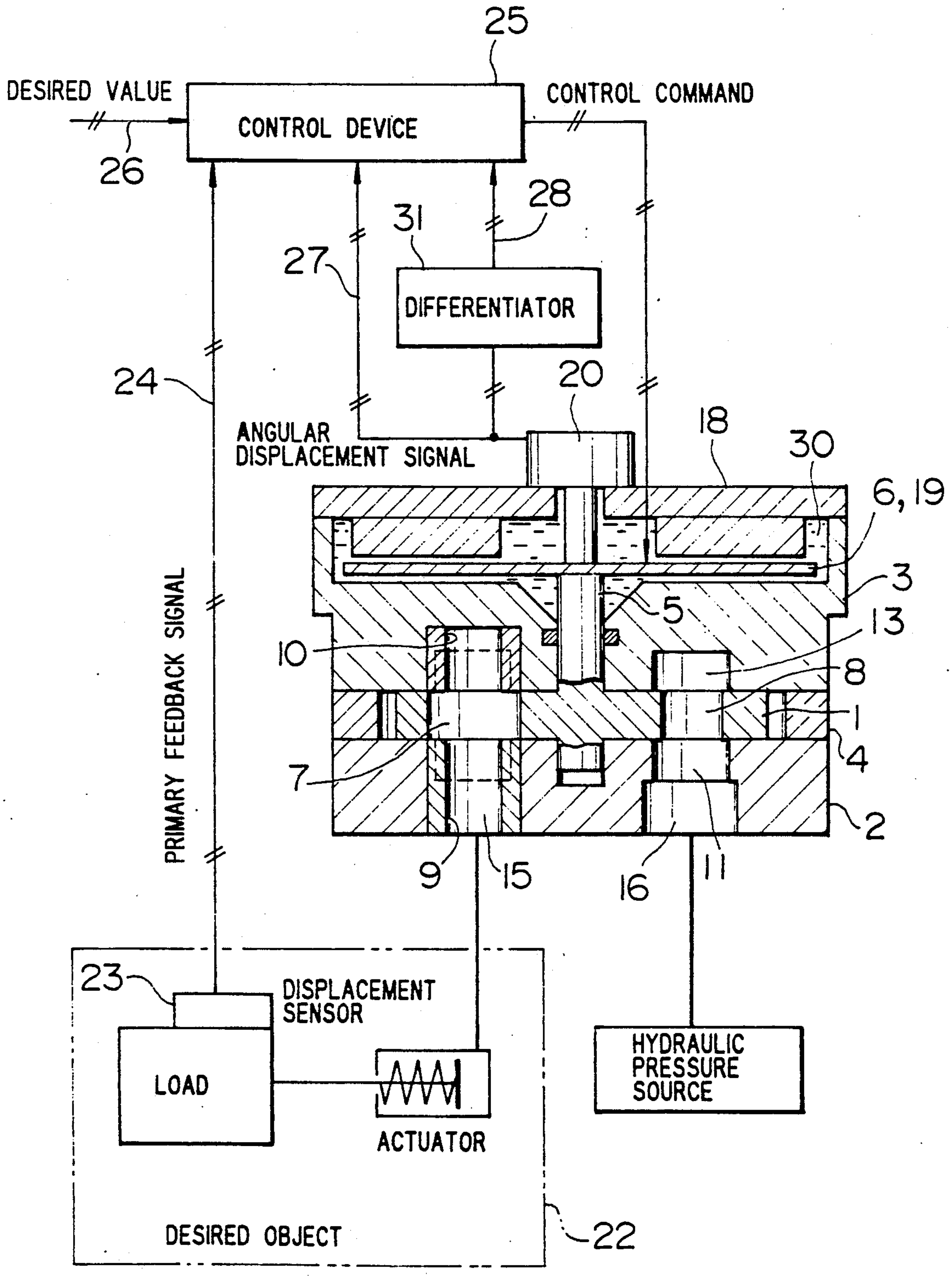
FIG. 11 is a partially cross-sectional view diagrammatically showing another embodiment of the present invention.

The embodiment of FIG. 11 is similar to the above-described embodiment of FIGS. 4-10 in that a position servo system is constructed using a direct-operated rotary servo valve, but the embodiment of FIG. 11 uses no angular velocity sensor and alternatively obtains an angular velocity signal by differentiating the output signal of an angular displacement sensor.

More specifically, one part of the output signal of the angular displacement sensor 20 is directly fed back to the control device 25 as the angular displacement signal 27, while the other part is differentiated by a differentiator 31 and fed back as the angular-velocity signal 28. The other arrangement is substantially the same as that of the embodiment of FIGS. 4-10.

Accordingly, since no angular velocity sensor is required and it is still possible to achieve advantages which are equivalent to those of the embodiment of FIGS. 4-10, the structure of the servo valve body can be simplified. If the differentiator 31 is disposed in the vicinity of the control device 25, no signal line for angular velocity feedback is required. Consequently, the construction of the entire control system is simplified and the reliability improves.

Figure 12:
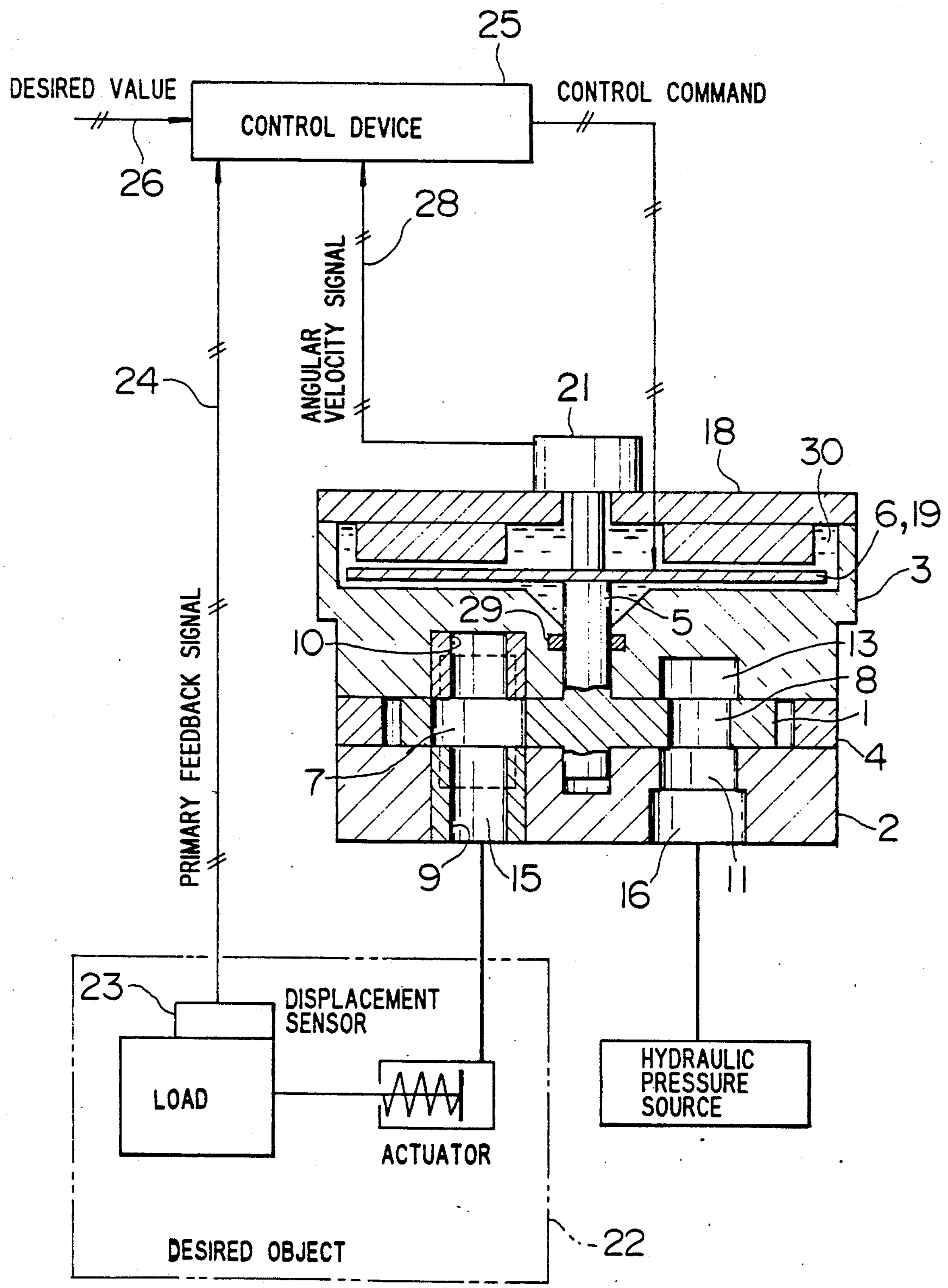
FIG. 12 is a partially cross-sectional view diagrammatically showing another embodiment of the present invention.

The embodiment of FIG. 12 is similar to each of the above-described embodiments in that a position servo system is constructed using a direct-operated rotary servo valve, but differs from either of them in terms of a valve-positioning method.

The movable element 6 is coupled to the magnet 18 through a torsion spring 32, and the angular velocity sensor 21 alone is disposed at the side of the magnet 18 which is opposite to the movable element 6. More specifically, when the movable element 6 and the valve member 1 are rotated by the driving force generated on the movable element 6, torsional moment which resists the driving force is generated in the torsion spring 32 to bring the rotation to a halt at a position where the moment derived from the driving force balances with the resistance moment. Consequently, the position of the valve member 1 is controlled by controlling electrical current to be supplied to the coils 19. Accordingly, no angular displacement sensor is required and it is still possible to achieve advantages similar to those of the previously-described embodiments by feeding back the output signal 28 of the angular velocity sensor 21.

Accordingly, in the above-described embodiment, since no angular velocity sensor is required, the structure of the servo valve body may be simplified and no signal line for angular displacement feedback is required. Consequently, the construction of the entire system is simplified and the reliability improves.

Figure 13:
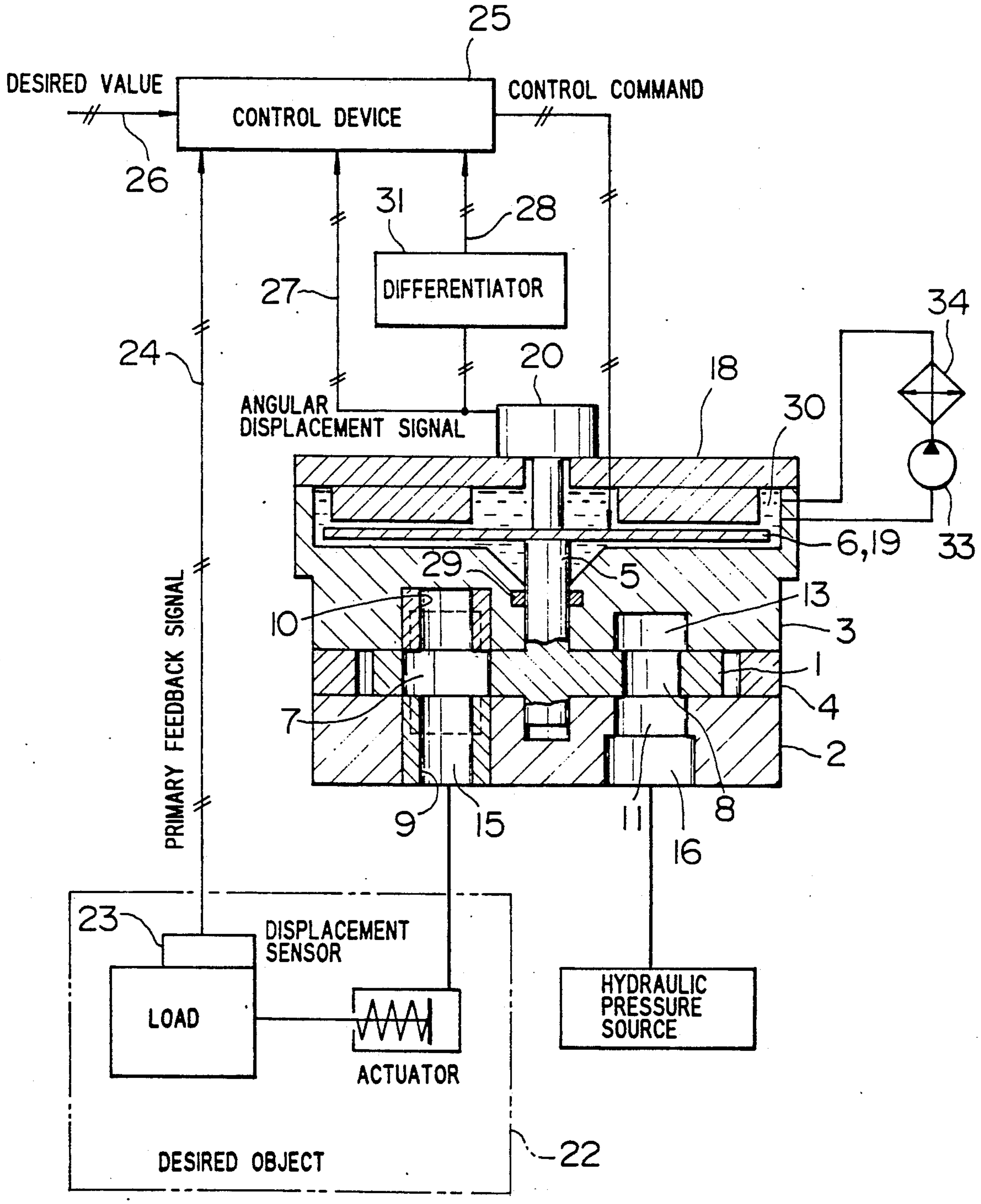
FIG. 13 is a partially cross-sectional view diagrammatically showing another embodiment of the present invention.

The arrangement of the embodiment of FIG. 13 similar to the direct-operated rotary servo valve of the embodiment shown in FIG. 11 except that a pump 33 is used to circulate the viscous fluid 30 charged in the gap between the movable element 6 and each of the casing 3 and the magnet 18, and a heat exchanger 34 is disposed midway along the circulating path. More specifically, heat generated by the coils 19 disposed on the movable element 6 is conducted outwardly of the driving means through the intermediary of the viscous fluid 30, and the conducted heat is dissipated to the outside by means of the heat exchanger 34.

If a satisfactory damping effect is to be achieved with conventional methods, a viscous fluid having a somewhat large viscosity is needed and is therefore difficult to circulate. In contrast, according to the present invention, since a viscous fluid having a small viscosity may be utilized owing to the effect of velocity feedback as described above, it is possible to circulate the viscous fluid in the manner explained above.

Accordingly, in accordance with the above embodiment, since the heat generated by the driving means can be efficiently dissipated to the outside, it is possible to prevent an excessive temperature rise in the driving means and far more stable characteristics can be achieved.

Figure 14:
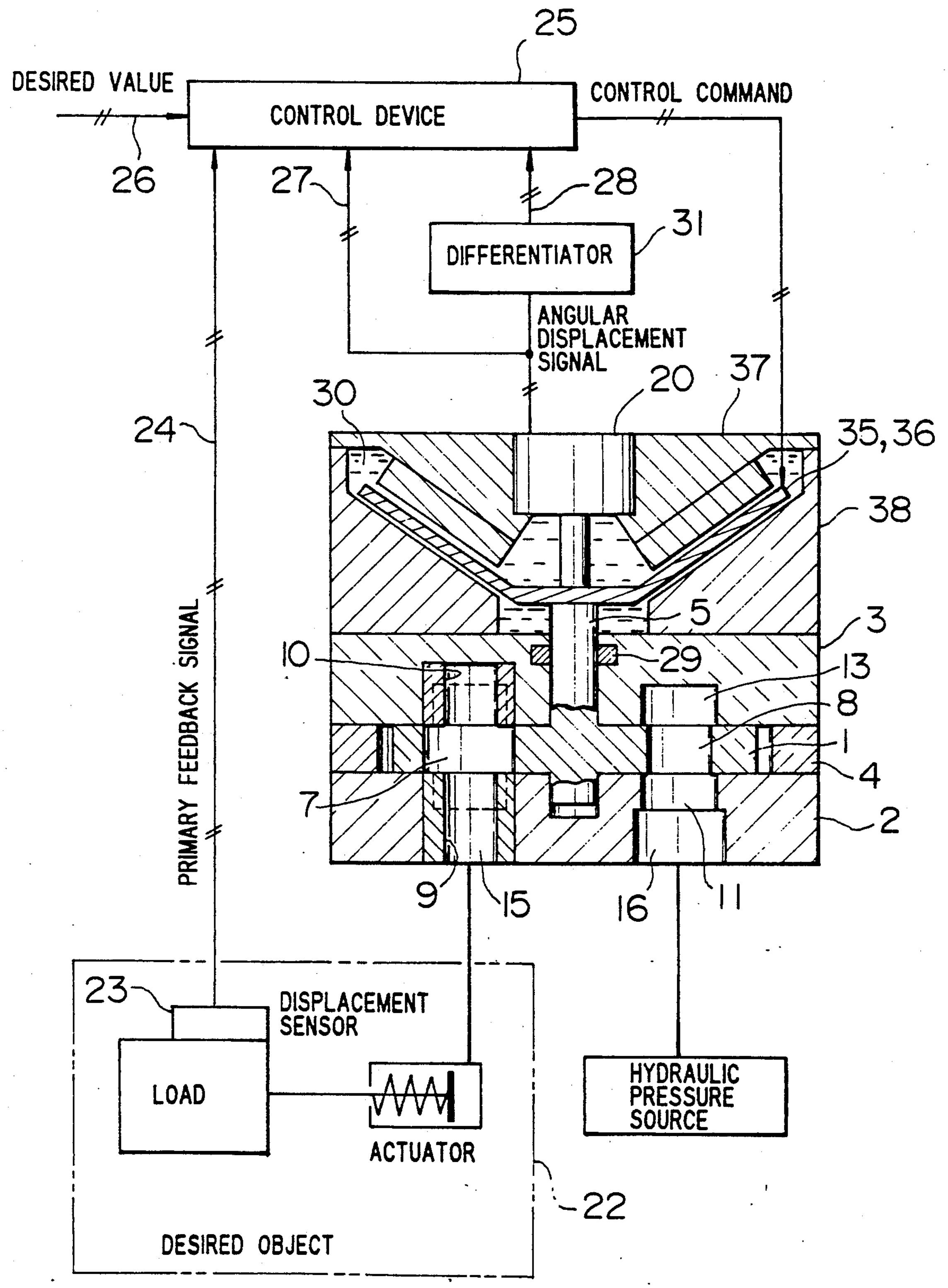
FIG. 14 is a partially cross-sectional view diagrammatically showing another embodiment employing a different form of driving means.
Figure 15:
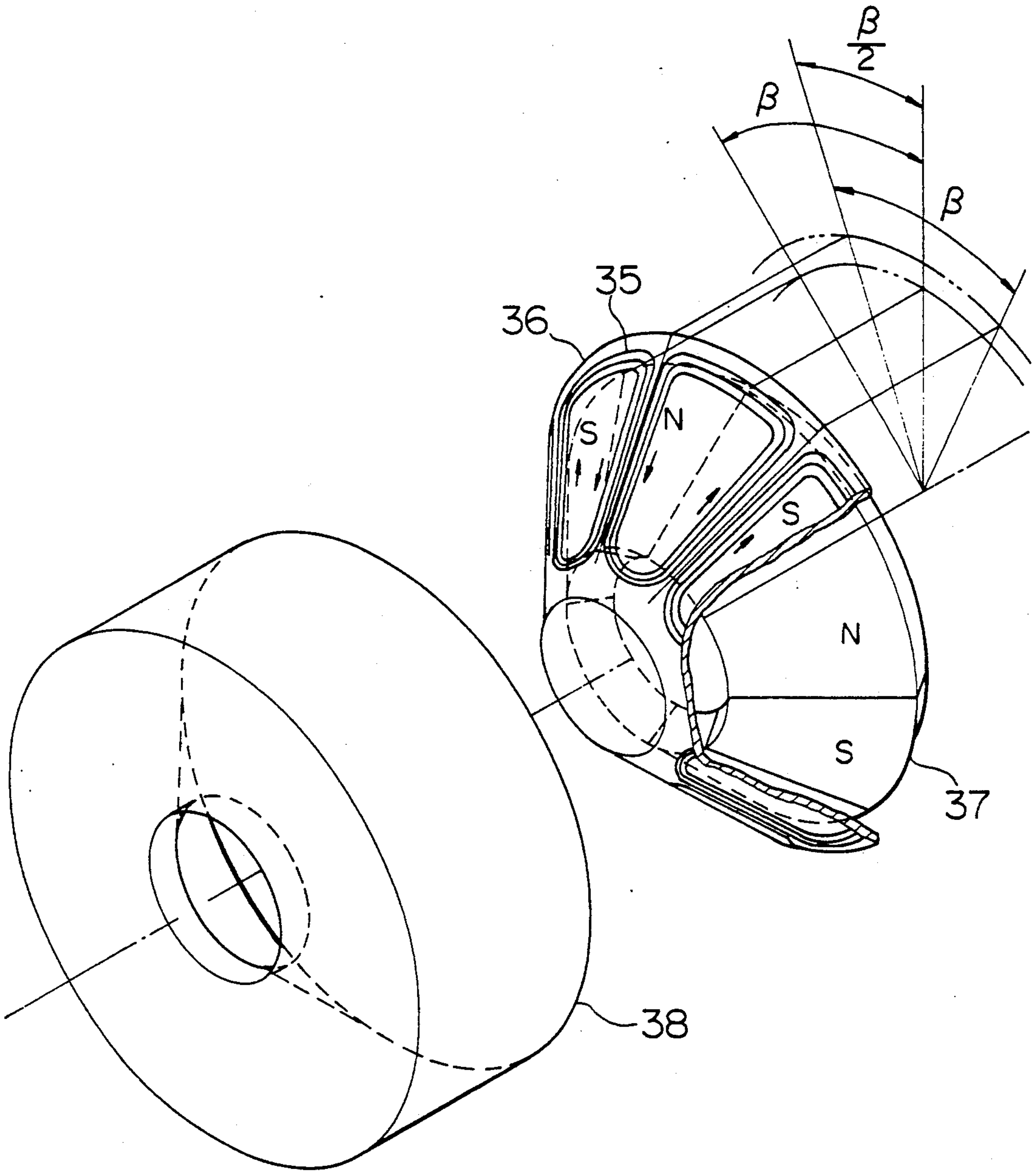
FIG. 15 is a perspective view diagrammatically showing the construction of the driving means of FIG. 14.

The present invention is applicable to an arrangement which utilizes a movable element having a conical configuration such as that shown in FIGS. 14 and 15.

As shown in FIG. 15, the driving means comprises a movable element 36 having a conical configuration and a plurality of coils 35 which are arranged so that the winding direction alternates around the circumference at intervals of angle $\beta$, a magnet 37 which is polarized so that the polarity of each pole alternates around the circumference at intervals of angle $\beta$, and a yoke 38 having a corresponding conical recess. The moving element 36 is rotatably disposed in a predetermined gap between the magnet 37 and the yoke 38. When the valve is in its neutral state, the boundaries between the coils 35 of alternate poles and the boundaries between the adjacent poles of the magnet 37 are offset from each other by the angle $\beta/2$. The operation of this embodiment is substantially the same as that of any of the previously-described embodiments utilizing disc-shaped movable elements. Accordingly, with the embodiment of FIGS. 14 and 15, it is also possible to achieve advantages similar to those of the embodiments described previously.

Figure 16:
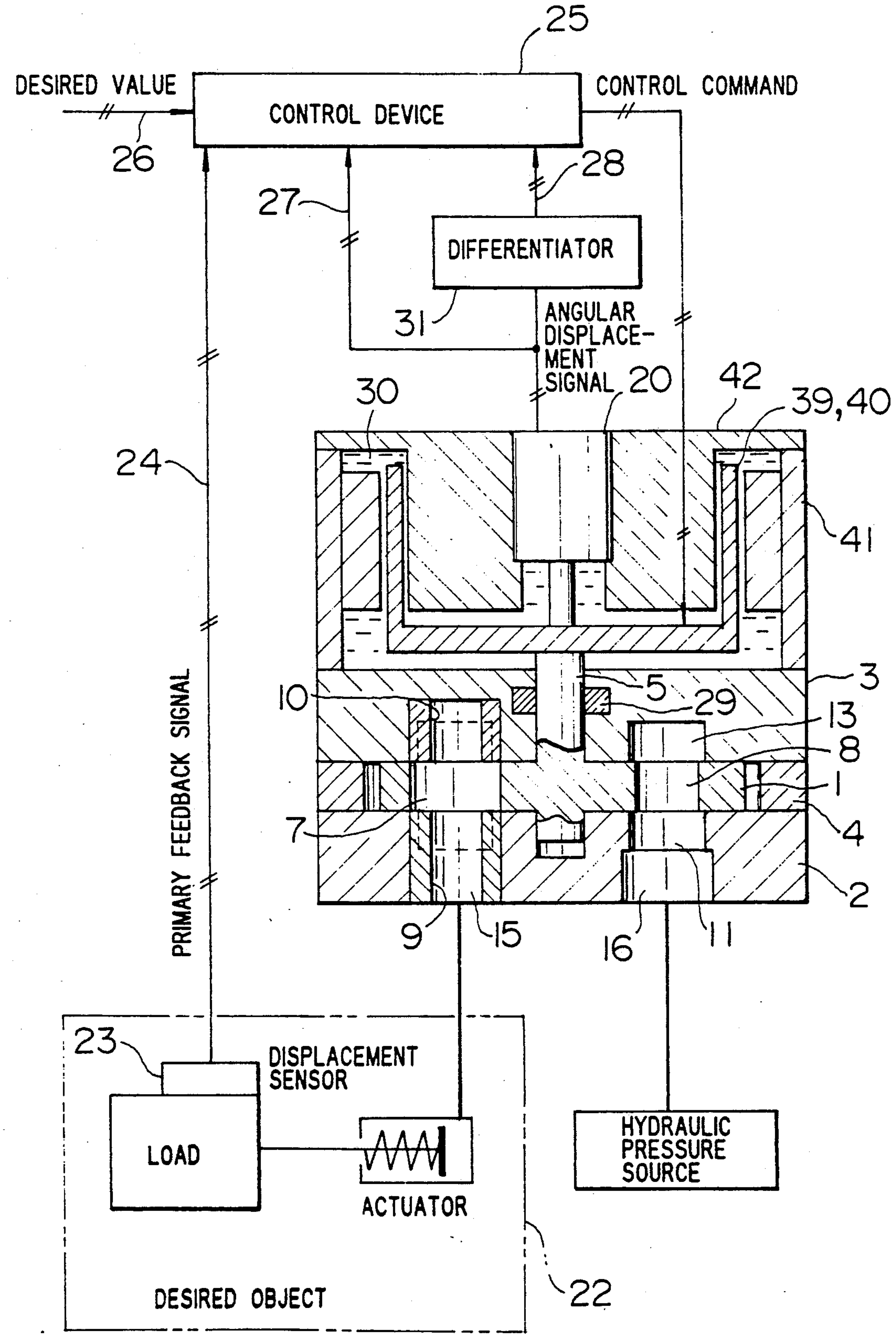
FIG. 16 is a partially cross-sectional view diagrammatically showing still another embodiment employing a different form of driving means.
Figure 17:
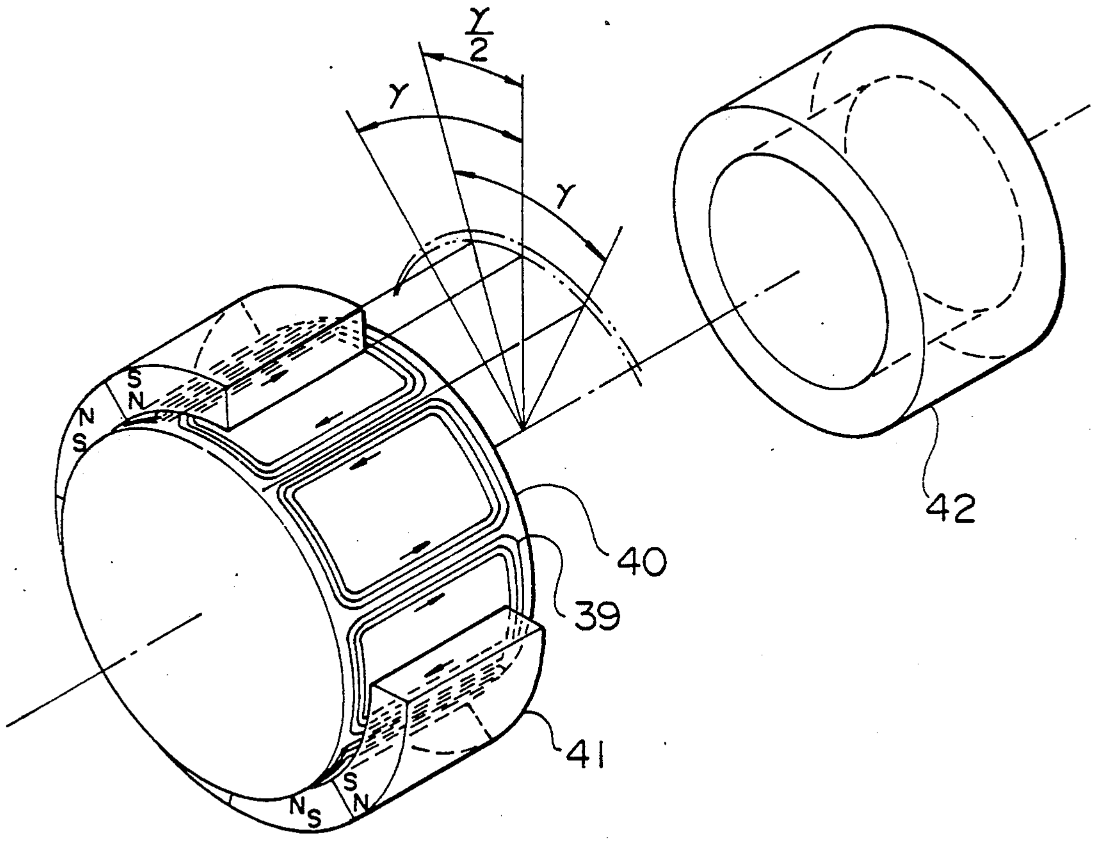
FIG. 17 is a perspective view diagrammatically showing the construction of the driving means of FIG. 16.

The present invention is applicable to an arrangement which utilizes a movable element having a cylindrical configuration such as that shown in FIGS. 16 and 17.

As shown in FIG. 17, the driving means comprises a movable element 40 having a cylindrical configuration and a plurality of coils 39 which are arranged so that the winding direction alternates around the circumference at intervals of angle $\gamma$, a magnet 41 which is polarized so that the polarity of each pole alternates around the circumference at intervals of angle $\gamma$, and a yoke 42 having a corresponding cylindrical recess. The moving element 40 is rotatably disposed in a predetermined gap between the magnet 41 and the yoke 42. When the valve is in its neutral state, the boundaries between the coils 39 of alternate poles and the boundaries between the adjacent poles of the magnet 41 are offset from each other by the angle $\gamma/2$. The operation of the embodiment of FIGS. 16 and 17 is substantially the same as that of any of the previously-described embodiments utilizing disc-shaped movable elements. Accordingly, with the embodiment of FIGS. 16 and 17, it is also possible to achieve advantages similar to those of the embodiments described previously.

The viscous fluid 30 charged in the gap between the movable element and the stator, i.e., the casing on the drive side and that between the movable element and the magnet may be of the same type as the working fluid in a fluid pressure circuit. In this case, the shaft seal 29 for isolating the valve side and the drive side is not needed and the structure of the servo valve body can be simplified to a further extent. Also, if an arrangement is adopted in which the viscous fluid 30, i.e., the working fluid, is returned to the return-side circuit of the valve section, it is possible to achieve heat dissipation by means of a heat exchanger disposed along the fluid pressure circuit without using the circulating pump 33 and the heat exchanger 34. Accordingly, the construction of the entire system can be simplified to a further extent.

Although any of the direct-operated rotary servo valves according to the above embodiments is a three-way valve, the present invention is applicable to a two-way valve, a four-way valve or a multiple-port valve having more ports. With any of these arrangements, it is possible to achieve substantially the same advantages.

Furthermore, the present invention is likewise applicable to a direct-operated servo valve using an ordinary spool valve.

Figure 18:
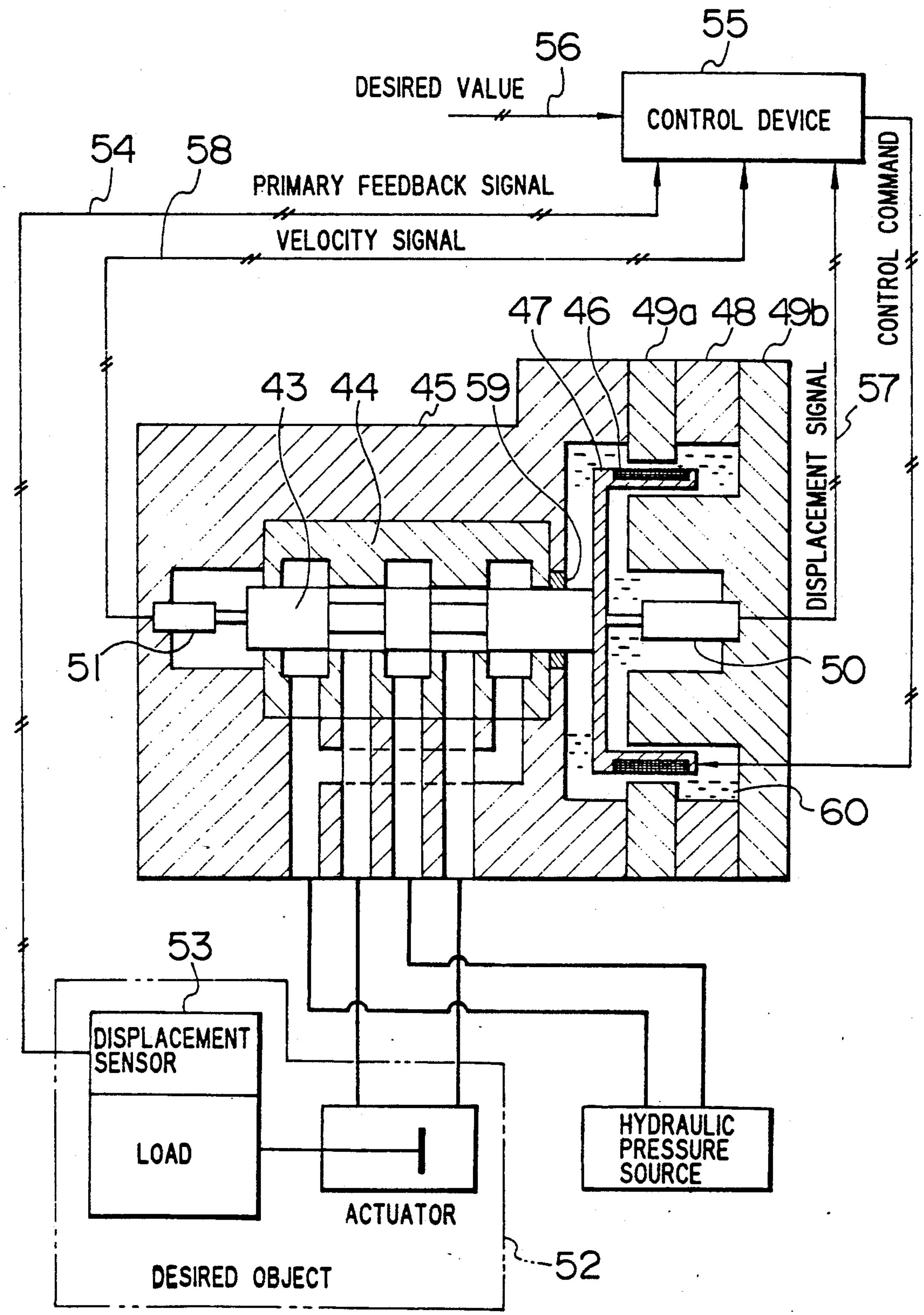
FIG. 18 is a partially cross-sectional view diagrammatically showing a further embodiment in which the present invention is applied to a direct-operated servo valve employing an ordinary form of spool valve.

In the embodiment of FIG. 18, a valve member or spool 43 is disposed for axial movement with respect to a sleeve 44, and the spool 43 and the sleeve 44 are disposed in a casing 45. A movable element 47 having a coil 46 which are wound in cylindrical form is integrally coupled to one end of the spool 43. The movable element 47 is axially movably disposed in a predetermined gap within a magnetic circuit formed by a magnet 48 and yokes 49*a* and 49*b*. Accordingly, if an electrical current is made to flow in the coil 46 wound around the movable element 47, and axial electromagnetic force is generated to directly drive the spool 43 and form a control orifice between the spool 43 and the sleeve 44, thereby controlling the flow of fluid. A displacement sensor 50 is disposed at one end of a movable part or spool 43 with a velocity sensor 51 disposed at the other end of the spool 43 adjacent to the movable element 47.

To execute position control of a desired object 52, a signal 54 output from a displacement sensor 53 provided on the desired object 52 is fed back as a primary feedback signal to a control device 55. The control device 55 compares the output signal 54 with a desired value 56, and drives the servo valve on the basis of the obtained deviation to control motion of an actuator. In addition, in the direct-operated servo valve of the embodiment of FIG. 18, a signal 57 output from the angular displacement sensor 50 is also fed back to the control device 55 to provide position control over the spool 43, whereby an output flow rate accurately proportional to an input signal can be obtained. In order to protect the movable element 47 from disturbances such as vibration or impact, the casing 45 is provided with a shaft seal 59 to isolate the valve side from the drive side, and a viscous fluid 60 is charged in the gap between the movable element 47 and the magnetic circuit formed by a stator or magnet 48 and the yokes 49*a* and 49*b* and the gap between the movable element 47 and the casing 45 so that the viscous resistance can be utilized to obtain a vibration-preventing effect. In addition, in order to provide damping for stabilizing the movement of the movable part during normal motion, a velocity signal 58 output from the velocity sensor 51 is fed back to the control device 55 to form a closed loop for velocity feedback.

In the embodiment of FIG. 18 as well, with respect to the direction of normal motion, the viscosity of the viscous fluid and the gain of the velocity feedback are set so that the damping effect based on the velocity feedback is greater than the damping effect derived from the viscosity of the viscous fluid 60. That is to say, in the state of normal motion, damping is obtained primarily utilizing the damping effect based on the velocity feedback.

Figure 4:
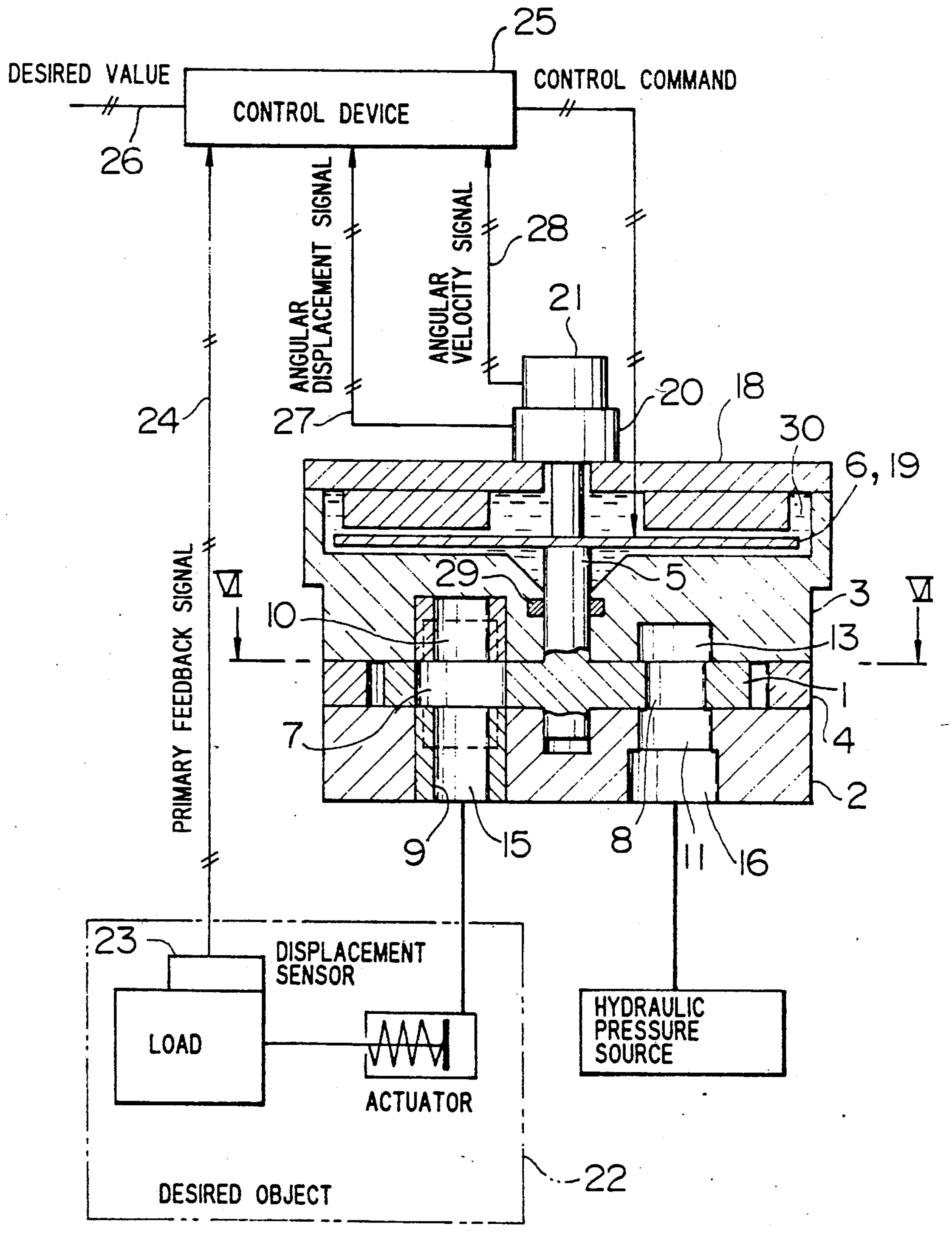
FIG. 4 is a partially cross-sectional view diagrammatically showing a direct-operated rotary servo valve according to one embodiment of the present invention.
Figure 5:
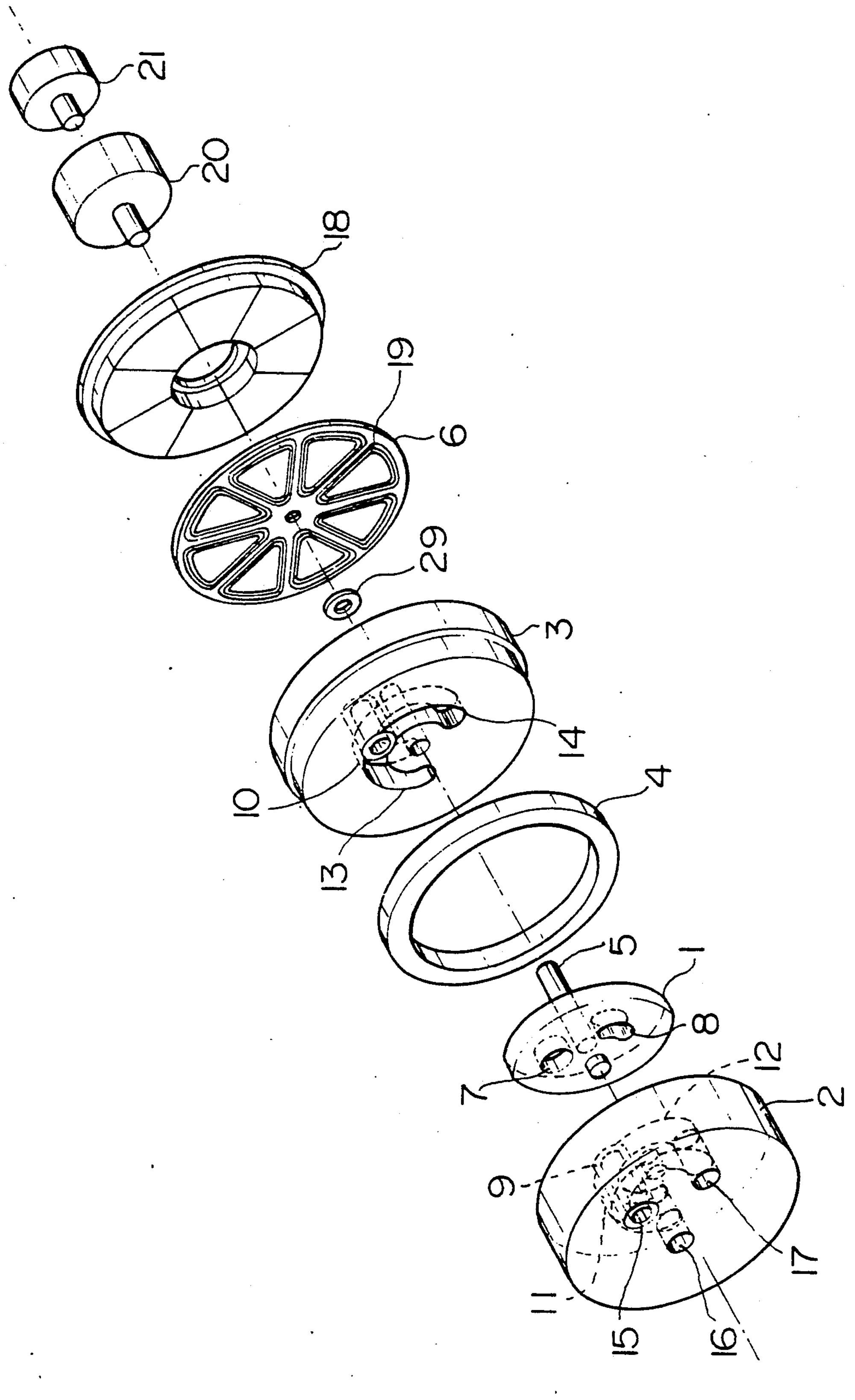
FIG. 5 is an exploded perspective view showing the construction of the direct-operated rotary servo valve of FIG. 4.

Accordingly, in the above embodiment, since the viscosity of the viscous fluid 60 can be reduced, it is possible to achieve advantages similar to those of the embodiment of the direct-operated rotary servo valve shown in FIG. 4.

Figure 19:
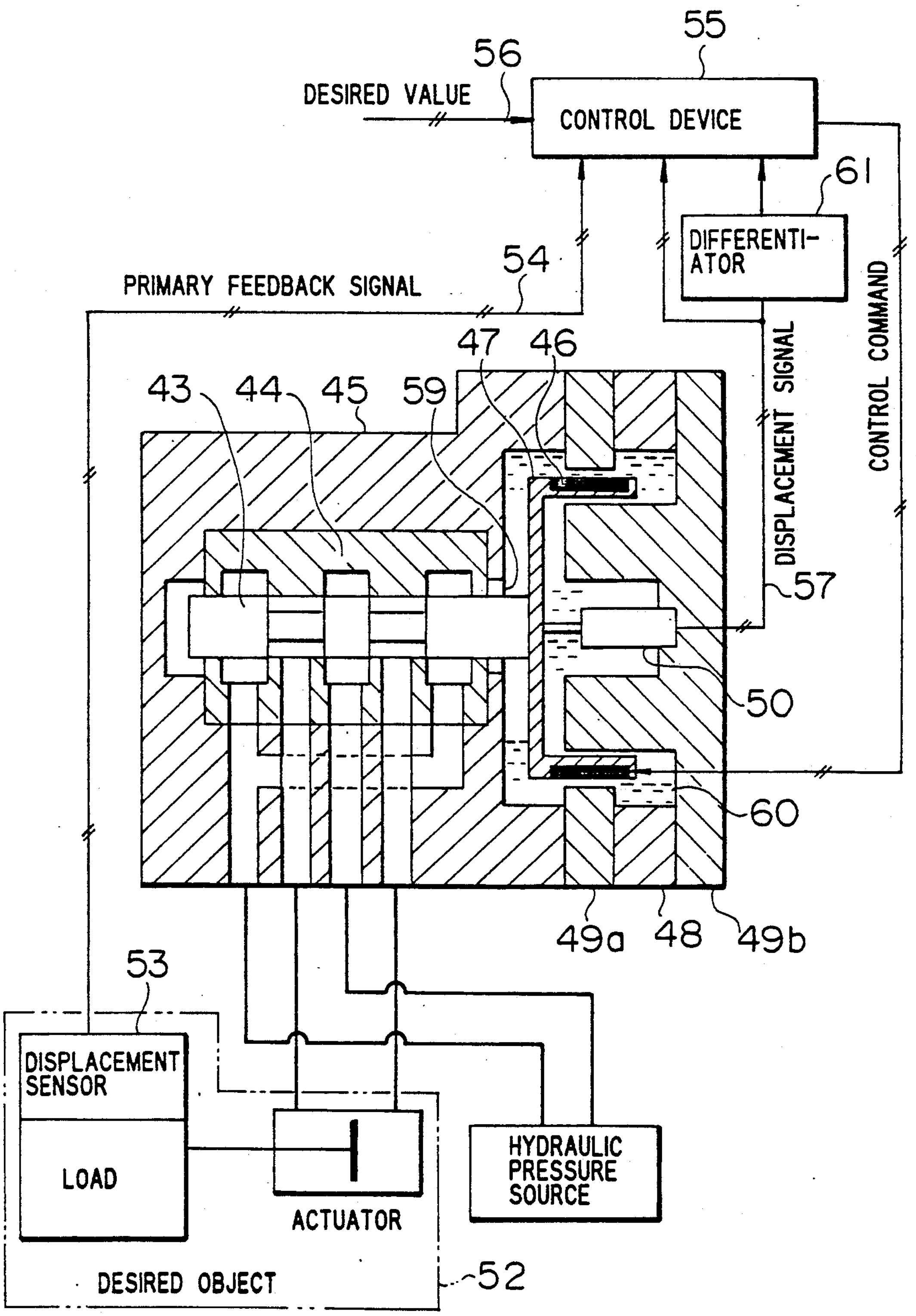
FIG. 19 is a partially cross-sectional view diagrammatically showing a still further embodiment of the present invention.

As shown in FIG. 19, no velocity sensor for velocity feedback may be used and alternatively the output signal of the displacement sensor 50 may be differentiated by a differentiator 61 and the result of the differentiation may be fed back to the control device 55. In this arrangement, similar to the embodiment shown in FIG. 11, the construction of not only the servo valve body but also the entire system can be simplified and the reliability improves.

Figure 20:
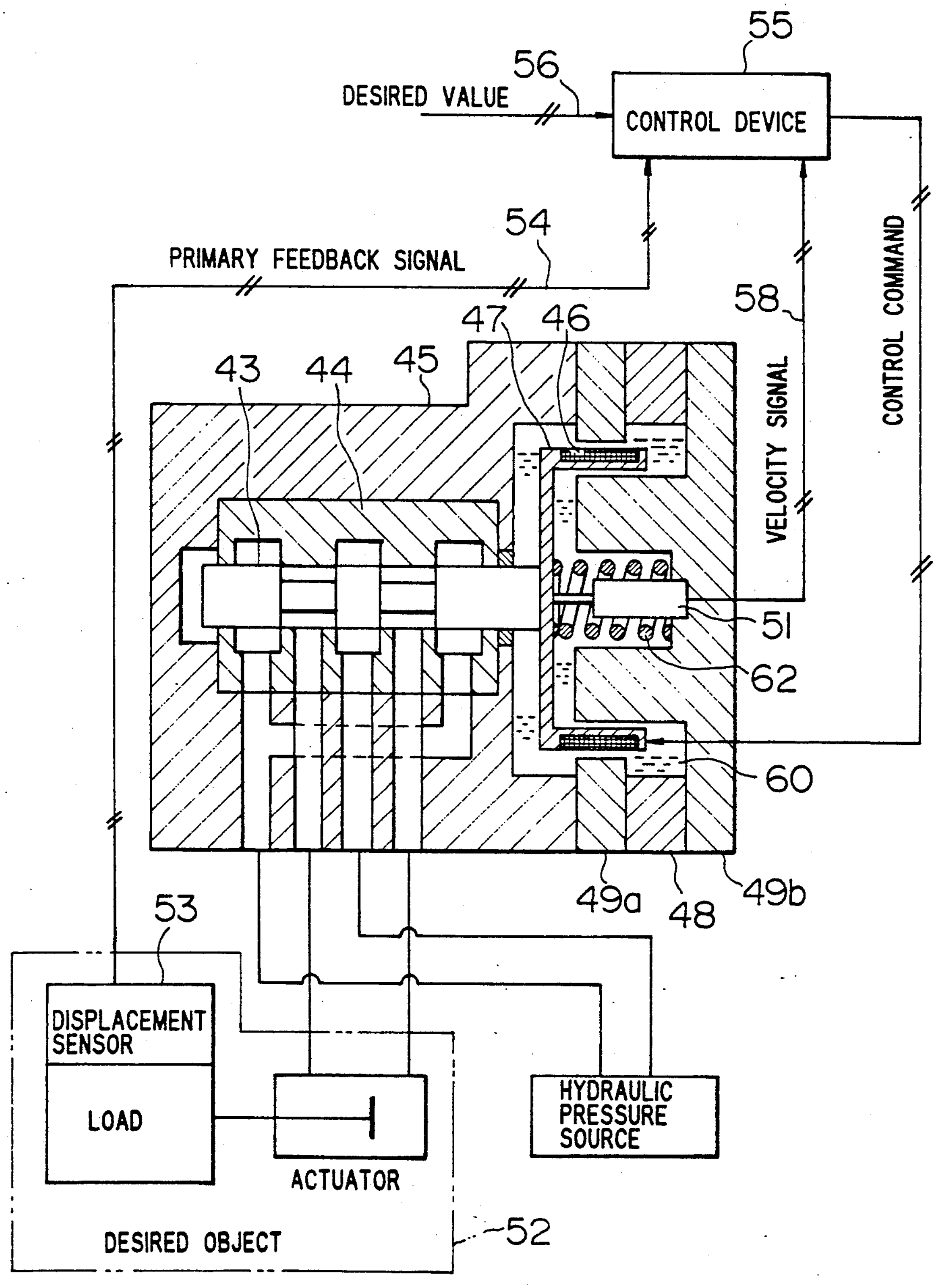
FIG. 20 is a partially cross-sectional view diagrammatically showing another embodiment of the present invention.

As shown in FIG. 20, the spool 43 may be held in position by using not a displacement sensor but a spring 62. In this arrangement, since it is only necessary to dispose the velocity sensor 51, the construction of the entire system can be simplified and the reliability improves.

Figure 21:
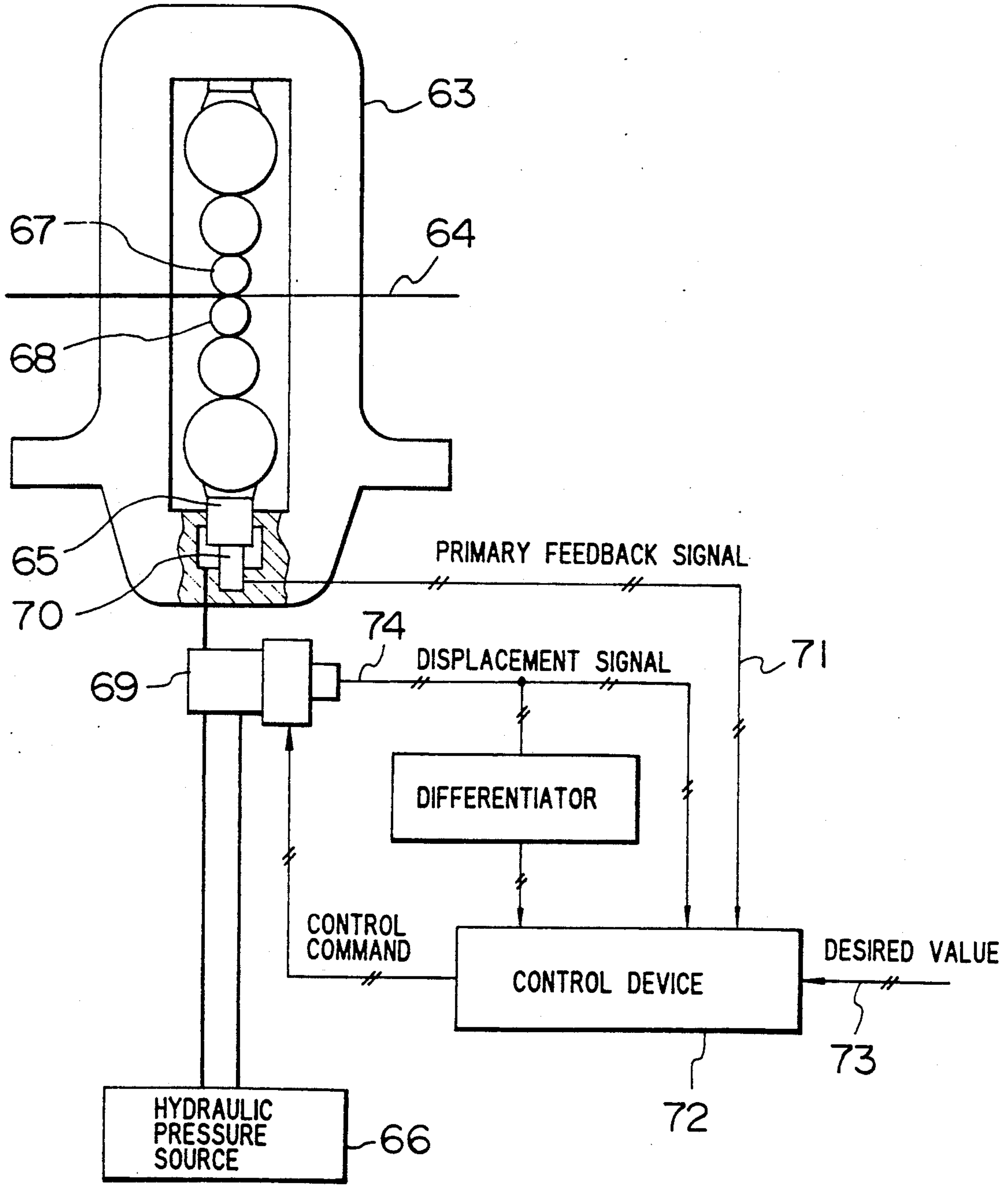
FIG. 21 is a schematic view showing an example of a hydraulic pressure control system for a rolling mill employing a direct-operated servo valve according to a specific embodiment of the present invention.

FIG. 21 shows an example of a hydraulic control system for a rolling mill which utilizes a direct-operated servo valve according to another embodiment of the present invention.

A rolling mill 63 is provided with a reduction jack 65 which serves as pressure means for applying a rolling load to a rolled material 64 and a direct-operated servo valve 69 for controlling the plate thickness of the rolled material 64 on the exit side of the rolling mill 63 by controlling a working fluid to be pumped between a hydraulic source 66 and the reduction jack 65 and adjusting the distance between working rolls 67 and 68. This direct-operated servo valve 69 is provided with a displacement sensor for detecting the displacement of a movable part, and a viscous fluid is charged in the gap between a stator and a movable element.

The reduction jack 65 is provided with a displacement sensor 70. A displacement signal 71 detected by the displacement sensor 70 is fed back as a primary feedback signal to a control device 72. The control device 72 compares the displacement signal 71 with a desired value 73, and drives the direct-operated servo valve 69 on the basis of the obtained deviation. A signal 74 output from the displacement sensor provided on the direct-operated servo valve 69 is divided into two parts in front of the control device 72. One part is directly supplied to the control device 72 as a displacement signal and used for controlling the position of the valve member, while the other part is differentiated by a differentiator 75, supplied as a velocity signal to the control device 72, and used for damping the motion of the servo-valve movable part. However, as described above, since the viscous fluid is charged in the gap between the stator and the movable element of the direct-operated servo valve 69, damping is also given by the viscous resistance of the viscous fluid. In this case, in the state of ordinary control, that is, with respect to the direction of normal motion of the direct-operated servo-valve movable part, the viscosity of the viscous fluid and the gain of velocity feedback are set so that a damping effect based on the velocity feedback is greater than a damping effect derived from the viscous resistance. The viscosity of the viscous fluid is chosen to be made small by an amount corresponding to the damping effect based on the velocity feedback.

Accordingly, in the above embodiment, since resistance is small which directly acts on the movable element which the movable part of the direct-operated servo valve is moving, the loss of driving force can be made small and no excessively large driving energy is required. Accordingly, driving means of small size may be utilized and no excessively large driving current is needed and good response characteristics can still be achieved. Moreover, the amount of heat generated by the driving means is reduced and the control device may be of small size. In addition, since velocity feedback is utilized for a primary damping source, even if the temperature of the direct-operated servo valve varies and the viscosity of the fluid varies, the characteristics of the system are not easily influenced. Accordingly, the state of rolling can be made consistently stable and rolled products of stable quality can be yielded.

In typical rolling mills, since an excessively large impact is generated particularly at the instant when the end of a rolled material is sandwiched between working rolls, control means such as servo valves require vibration-preventing performance sufficient to endure such impact. In the direct-operated servo valve according to the embodiment of FIG. 21, since the viscous fluid charged in the driving means has a damping effect on disturbances in every direction, vibration of the movable element in particular can be effectively prevented and the durability and reliability of the servo valve are improved.

In ordinary arrangements, control devices are disposed in control rooms remote from the bodies of rolling mills. In contrast, in the above embodiment, since a velocity is set by the differentiator disposed in front of the control device, it is only necessary that a signal line for feeding back the primary feedback signal 71 and the displacement signal 74 associated with the servo-valve movable part be disposed between the body of the rolling mill and the control room. Accordingly, since no signal line for velocity feedback is required, the construction of the system is simple and inexpensive and the reliability thereof is improved to a further extent.

As is apparent from the foregoing, in the direct-operated servo valve according to any of the above embodiments, the loss of driving force due to damping can be made small and no excessively large driving energy is required. Accordingly, driving means of small size may be utilized and no excessively large driving current is needed and good response characteristics can still be achieved.

Further, even if disturbance such as vibration or impact occurs, a satisfactory vibration-preventing effect can be obtained owing to the viscous resistance of a fluid. Accordingly, it is possible to accomplish improvements in vibration resistance and durability, hence, reliability.

Also, since velocity feedback is utilized as a primary damping source, it is possible to easily electrically adjust damping characteristics to characteristics best suited for various service conditions. Even if the viscosity of the fluid varies with a temperature, the damping characteristics do not substantially vary, whereby consistently stable characteristics can be obtained.

Since a viscous fluid having a small viscosity may be utilized, it is possible to easily circulate the viscous fluid. If heat exchange is effected midway along the circulating path, the heat generated by the driving means can be further efficiently dissipated to the outside, whereby it is possible to suppress an excessive temperature rise in the driving means to a further extent.

If velocity feedback is provided by utilizing a velocity signal obtained by differentiating a displacement signal, no velocity sensor is required and the structure of the servo valve body is simplified. In addition, since no signal line for velocity feedback is required, the construction of the system is simplified and the reliability thereof is improved.

As described above, in accordance with the present invention, there is provided a highly reliable direct-operated servo valve which is not susceptible to a disturbance such as vibration or impact, which consistently exhibits stable damping characteristics, and which can operate with reduced driving energy. If the present invention is applied to the hydraulic control device of a rolling mill in particular, a highly reliable system can be realized and rolled products of stable quality can be yielded. Furthermore, economical benefits such as reductions in the costs and expenses of equipment can be enjoyed.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A rotary servo valve comprising:
- a casing structure including a pair of opposed casing members;
- a valve member rotatably disposed between said pair of opposed casing members;
- a stator secured to said casing structure;
- a rotary shaft integrally connected to said valve member and arranged so as to be drivable by a drive command;
- a viscous fluid charged between said stator and said rotary shaft; and
- means for detecting an angular velocity of said valve member and feeding back said detected angular velocity to the rotary shaft so as to damp the motion of said valve member, and
- wherein said valve member includes a first hole means and a second hold means extending through said valve member in a direction of an axis of rotation thereof, one casing member includes a sleeve for forming a control orifice in cooperation with said first hole means and channels arranged to be separated from each other by said sleeve, and wherein a control port is connected to said sleeve, and a supply port and discharge port are connected to the respective channels.

2. A direct-operated servo valve according to claim 1, wherein said valve member has a configuration which covers said sleeve and the whole of said channel to which is connected said supply port and a part of said channel to which is connected said discharge port.

3. A direct-operated servo valve according to claim 1, wherein damping based on the velocity feedback of said valve member is selected to be greater than damping derived from the viscous resistance of said viscous fluid.

4. A direct-operated servo valve according to claim 1, wherein said velocity signal is a signal output from a velocity sensor.

5. A direct-operated servo valve according to claim 1, wherein said velocity signal is a signal obtained by differentiating a signal output from a displacement sensor.

6. A rotary servo mechanism comprising:

a casing structure including a pair of opposed casing members;

a valve member rotatably disposed between said pair of opposed casing members;

a drive section including a stator secured to said casing structure and a rotary shaft integrally connected to said valve member;

a control section for giving a drive command to said rotary shaft;

a viscous fluid charged between said stator and said rotary shaft; and means for detecting an angular velocity of said valve member and feeding back said detected angular velocity to the rotary shaft so as to damp the motion of said valve member, and wherein said valve member includes a first hole means and a second hole means extending through said valve member in a direction of an axis of rotation thereof, one casing member includes a sleeve for forming a control orifice in cooperation with said first hole means and channels arranged to be separated from each other by said sleeve, and wherein a control port is connected to said sleeve, and a supply port and discharge port are connected to the respective channels.

7. A fluid pressure servo mechanism according to claim 6, further comprising a heat exchanger for cooling said drive section, said heat exchanger being disposed midway along a circulating path in which said viscous fluid is circulated.

* * * * *